Figure 1:
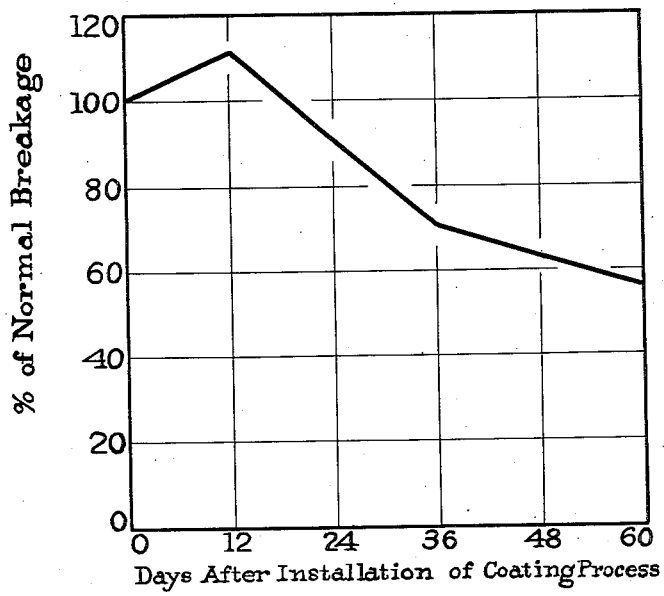

United States Patent Office 2,827,440
Patented Mar. 18, 1958

2,827,440

ORGANOPOLYSILOXANE COATING COMPOSITION AND METHOD FOR COATING GLASS THEREWITH

Roy S. Arrandale and Robert G. Dreyfuss, Elmira, N. Y., assignors to Thatcher Glass Manufacturing Company, Inc., Elmira, N. Y., a corporation of New York Application December 13, 1956, Serial No. 628,161

16 Claims. (Cl. 260—29.2)

This invention relates to a novel process and composition for applying a protective and lubricating coating to glass and items manufactured from glass. More particularly, this invention relates to a novel process and coating composition whereby in filling and refilling operations in glass bottles or containers, a protective and lubricating coating is applied thereto.

New bottles, as delivered from a manufacturer, have in the past carried a natural oil film on their surface which was acquired during the annealing process in oil-fired lehrs or baking ovens. This film was removed, however, during filling line operations and any protection derived therefrom was present only during the initial trip from the manufacturer to the filling line. The important problem of protecting the bottles during further handling operations, and particularly in the handling of returnable containers, has remained with the industry.

Protection of the surface of glass, and, more particularly, glass bottles and containers, against abrasions and scratches is of prime importanec in preserving the appearance and strength of the glass.

The minor abrasions and scratches which occur during the normal handling of such containers provide natural areas for the deposit of dirt and embedded scum with resultant severe loss in attractiveness of the container. The sparkling appearance of a new glass bottle cannot be maintained under such conditions. The bottle will progressively lose its original lustre. As a result, one of the prime advantages of glass as a packaging material is lost.

Of equal if not greater importance is the loss of strength which occurs due to even minor surface scratches. Glass naturally has a strong surface, but when this skin is broken, a weak spot is formed. These weak spots are susceptible to further abrasions which also result in breakage. It is well known that most glass-container breakage occurs at such weak spots. It is also known that the weakening effect of the surface defects is much greater when the surface is in contact with water or water vapor than it is when the surface is dry or in contact with organic solvents. It is obvious, of course, that if the breakage occurs in the filling line or in the capping and subsequent handling operations, the contents of the container will also be lost. The industry is thus faced with what can be a severe economic loss.

It is an object of the present invention to provide a novel coating composition and process for applying said composition which will protect glass surfaces, particularly the surface of glass containers.

It is a further object of this invention to provide a protection which will prevent surface abrasion and preserve the original strength and appearance of the glass.

It is a still further object of this invention to provide a coating composition which is economical and easy to apply.

Specifically, it is an object of this invention to provide a coating composition comprising a siloxane having the formula:

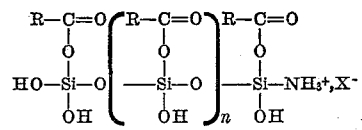

wherein R is an aliphatic radical, X is a halogen, and $n$ is an integer from 1 to 3, and a polyoxy alkylene fatty acid ester of the formula:

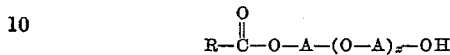

wherein A is a lower alkylene radical, R is as defined above, and $x$ is a number from 8 to 100, these components being dissolved in an organic solvent as described hereinafter.

Other objects will appear in the following description of the invention.

The protective coating provided by the present invention comprises in part, a silicone resin. It has been known in the past to apply a silicone resin to the interior of bottles and vials to form "drain-clear" containers. Such coatings make use of the well-known hydrophobic characteristics of silicone resin to permit a more complete drainage of the container. These coatings, which are described in the prior art, are to be distinguished from those provided by the present invention. It is to be observed that the prior coatings are applied in an organic solvent and consist simply of a silicone resin. Furthermore, a heat treatment is necessary to cure the coating.

In connection with the above, a number of silicone resins are known to the art which have the basic formula:

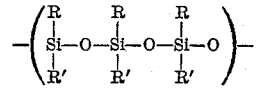

where R may be an alkyl, aryl, or alkaryl radical, and R' may be of any of the above radicals, but in addition must be, at least in part, a hydroxy radical. Silicone resins such as these may be employed in the present composition with some beneficial results but have certain disadvantages which are undesirable. For instance, the resultant coating tends to "creep" and when originally placed solely on the exterior of the bottle, will tend to move up over the neck and mouth into the interior of the container. In addition, it has been found that a heat treatment at about 250° F. for about 5 to 10 minutes is required to effect a cure.

Another type of silicone resins is also generally known and is typified by tristearate trisiloxane amine hydrochloride. The structure of these siloxanes may be represented as:

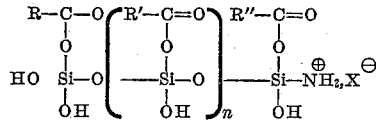

where R, R' and R" are long-chain aliphatic radicals, which may be unsaturated, having, for instance, from 12 to 40 carbon atoms, and need not be the same; and where $n$ varies from 1 to 3 inclusive and X stands for Cl⁻, Br⁻, or I⁻. The acyl group may be derived, for instance, from arachidic acid, ceratic acid, palmitic acid, lauric acid, oleic acid, etc., or in general, those acids forming salts having detergent properties. These latter siloxanes, particularly tristearate trisiloxane amine hydrochloride, have been found by us to be especially effective in the practice of the present invention and are preferred. No extended heat treatment is required to cure the coating, and there is little or no tendency to creep.

The above acyloxy silicones are effective when applied as the sole coating constituent; the invention is of particular merit when these silicones are employed with a minor amount of a polyether ester of fatty acids. It has been discovered that the valuable properties of the coating are remarkably increased by the presence of as little as 1% of such an ester along with the polysiloxane. Such polyether esters include the polyoxyethyl stearate, hereinbefore mentioned, and in addition, stearate esters of polyoxypropyl and polyoxybutyl ethers. The polyoxy lower alkyl ether should have a molecular weight from 650 to about 5000. Long-chain fatty acids other than stearic acid may be used herein, such as those enumerated above with reference to the siloxane resin.

Generally speaking, the polyoxyether ester may be present in an amount from about .2% to about 50% by weight of the mixture of the two components. The preferred range is from about 2% to about 8% since the major advantages resulting from the synergism which is apparently evidenced in the composition, as pointed out hereinafter, are realized within this range.

The compositions described above are prepared in a solution in an organic solvent. The solvent which is employed is chosen not only with the view to enable later water dilution, but is also selected for its own effectiveness as a strengthening agent for glass. Among suitable solvents are lower alkyl alcohols having up to about 6 carbon atoms and which may be primary, secondary, or tertiary alcohols; alkoxy alcohols such as methoxy methanol, methoxy ethanol, ethoxy ethanol, etc.; lower alkyl ketones such as acetone, methylethyl ketone, diethyl ketone, etc.; glycols such as ethylene glycol, propylene glycol, butylene glycol, etc.; ether glycols such as diethylene glycol, dipropylene glycol, 1,2-dipropylene glycol, etc.; and lower alkyl esters such as methyl acetate, ethyl acetate, methyl propionate, ethyl propionate, etc. It has been discovered, however, that glass has a higher tensile strength in the presence of tertiary alkyl alcohols than any other solvents, for instance, isopropyl alcohol. For this reason, in part, tert.-butyl alcohol is an advantageous solvent. Tert.-amyl alcohol may also be employed.

Improved results have also been mounted when a lower aliphatic acid, such as acetic or propionic acid is added to the mixture. This is especially true when tap water is later employed. With reference to the siloxane/polyoxyether ester/acid/solvent mixture, the relative proportions will be 15–20 parts/0.3–10 parts/0.5–10 parts/60–80 parts, respectively; with the preferred range being 18–20 parts/.4–2 parts/4–7 parts/70–80 parts, respectively. The best combination noted by applicant has the following composition by way of example:

| | Percent |
|---|---|
| Tristearate trisiloxane amine hydrochloride | 18.7 |
| Polyoxyethylene stearate (M. W. about 2045) | 1.1 |
| Glacial acetic acid | 5.5 |
| Solvent (tert.-butyl alcohol) | 74.7 |
| | 100 |

Equivalent amounts (by weight) of trioleate trisiloxane amine hydrochloride, tripalmitate trisiloxane amine hydrobromide, tetra arachidate tetrasiloxane amine hydrochloride or hexastearate hexasiloxane amine hydrobromide may be employed in the above compositions in place of the tristearate trisiloxane amine hydrochloride. Likewise, in place of the polyoxyethylene stearate, there may be used polyoxyethylene palmitate, polyoxybutylene caprylate, polyoxypropylene laurate, polyoxypropylene stearate, etc., wherein the polyoxyl alkylene group may have from 8 to 100 ether units. These compositions are prepared so that there is sufficient polyether ester present to impart the desired extra lubricity and gloss without diminishing the water repellancy of the coating, and the amount of acid is sufficient to prevent hydrolysis of the silicone which normally takes place in tap water.

When the coating is to be applied, the concentrated mixture described above is placed in an aqueous suspension. The suspension will generally contain only from about .05% to about 10% by weight of the mixture, a range from about 0.1% to about 2% being preferred for best results. The coating is then deposited on the exterior of the glass container by spraying the aqueous suspension on said container or by dipping the container in said solution. This operation can be conveniently performed in a filling line operation as an extra stage, advantageously immediately after the washing station. It is believed, though the invention is not limited by the theory, that the extremely small concentration of the coating ingredients in the aqueous suspension is effective due to an adsorption mechanism at the surface of the glass.

The coatings on the glass surface provided by this process possess a number of unusual and valuable characteristics. To begin with, the feature of lubrication deserves special comment. It is well known that when moving glass surfaces come in contact with each other, as for instance between bottles moving along a filling line, they will seize and the contact areas become scratched. Glass bottles when coated with the present composition, however, are rendered quite slippery and on contact will slide over each other without seizing and without scratching. The effectiveness of the coating composition is dramatically evidenced by the change in noise made by bottles during stacking operations. Instead of a ringing sound from glass-to-glass contact, a dull clanging sound is heard. This is because the direct blows are turned into glancing blows due to the lubricating of the coating.

The remarkable effectiveness of the process is indicated by the following tables:

TABLE I

| Coating | Bottles [5] Tested | Sliding [6] Angle, degrees | Percent increase [7] in lubricity |
|---|---|---|---|
| Sulphur bloom (as received) | 10 | 31.5 | −34.6 |
| Washed with tap water (uncoated) | 10 | 23.4 | 0.0 |
| Siloxane and tap water [1] | 10 | 16.7 | +28.6 |
| Siloxane and acetic acid and tap water [2] | 10 | 16.0 | 31.6 |
| Polyether ester and tap water [3] | 10 | 13.8 | 41.0 |
| Siloxane and polyether ester and tap water [4] | 10 | 8.8 | 62.5 |

[1] 0.132% of a tristearate trisiloxane amine hydrochloride solution (20% in tert.-butyl alcohol).
[2] 0.132% of a tristearate trisiloxane amine hydrochloride solution (20% in tert.-butyl alcohol) containing 1.56% acetic acid.
[3] 0.132% polyoxyethylene stearate.
[4] 0.132% of a tristearate trisiloxane amine hydrochloride solution (20% in tert.-butyl alcohol)+0.132% polyoxyethylene stearate.
[5] The bottles were standard square quart milk bottles.
[6] The average angle at which one bottle would slide when placed on a second bottle on an inclined plane which was then elevated.
[7] Increase over the standard selected as uncoated tap water washed bottles.

This table indicated the improved lubricity which is observed when (1) acetic acid is added to the siloxane composition and (2) when the polyoxyether ester is also incorporated therewith.

Further evidence of the synergism between the polyoxyether ester and the siloxane can be seen from the following table:

TABLE II

| Coating | Bottles Tested | Sliding Angle, degrees | Percent increase [4] in lubricity |
|---|---|---|---|
| 50/50 mixture [1] | 10 | 10.3 | 27.0 |
| 1/100 mixture [2] | 10 | 11.0 | 22.0 |
| Siloxane and Propionic Acid [3] | 10 | 14.1 | 0.0 |

[1] 0.132% wt./vol. of polyoxyethylene stearate and 0.132% of a tristearate trisiloxane amine hydrochloride solution (20% in tert.-butyl alcohol) with 1.5% propionic acid in tap water.
[2] 0.0013% wt./vol. of polyoxyethylene stearate and 0.132% of a tristearate trisiloxane amine hydrochloride solution (20% in tert.-butyl alcohol) with 1.5% propionic acid in tap water.
[3] 0.132% of a tristearate trisiloxane amine hydrochloride solution (20% in tert.-butyl alcohol) with 1.5% propionic acid in tap water.
[4] The last entry is the standard for comparison in this table.

It is apparent that substantially the full benefit from the added polyoxyethylene stearate is obtained with the addition of only 1% to the 20% silicone-alcohol solution.

An equally noteworthy feature of the coating lies in the increased strength which is conferred on the glass surface. The coating appears to act as a filling or bond in those scratches which may have penetrated the outer skin of the glass surface. Due to the apparently great adhesive forces between the composition and the glass, a large portion of the original strength is restored to a scratched glass surface on deposition of the coating in the scratches.

Figure 2:
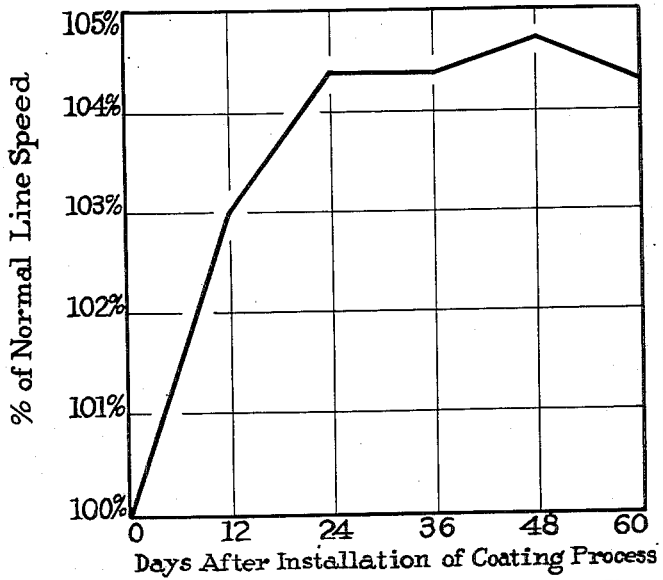

The accompanying graphs, Figures 1 and 2, indicate the increase in strength which results from the coating. Figure 1 shows the decrease in breakage of T-square milk bottles in the normal filling line operation after the coating process equipment is installed immediately after the washing station. In Figure 2, the increase in filling line speed is recorded. This increase results from the elimination of delays caused by breakage. By normal line speed is meant the line speed in units/hour which is calculated by dividing the total units (i. e. bottles) which were filled by the elapsed operating time of the filling line. By "normal breakage" is meant the percentage of breakage observed for 55 days of filling line operation without the installation of the coating process as a stage thereof.

An additional feature of the invention lies in the incorporation of a bactericide in the coating solution for sanitation purposes. A wide range of bactericides may be used in this manner, only a small amount being necessary. By way of example, those bactericides described in U. S. Patent No. 2,759,869 are of particular value in this connection.

Example I

A solution was prepared by dissolving tristearate trisiloxane amine hydrochloride (1.86 pounds), polyoxyethylene stearate (average M. W. 2045) (.1 pound), glacial acetic acid (.55 pound) in tert.-butyl alcohol to form a solution having a density of 0.83. An appropriate portion of this solution was then added to tap water to form an aqueous solution containing 0.0264% of the siloxane and 0.013% of the polyether stearate. This dilute aqueous solution was then sprayed on milk bottles at ambient temperatures, from 20–25° C. The bottles were allowed to freely drain over a tank so that the excess solution was recovered to later be applied to other bottles by the same spray mechanism. The coated bottles were observed to have a high gloss and slick surface. On contact with other bottles similarly coated, they were observed to freely slide over one another. The decrease in breakage which was observed during normal handling operations of the coated bottles also indicated the increase in bottle strength which has been discussed above.

Example II

A solution was prepared by dissolving tripalmitate trisiloxane amine hydrobromide (1.8 pounds), polyoxyethylene stearate (average M. W. 1650) (.07 pound), glacial acetic acid (.5 pound) in tert.-butyl alcohol to a total volume of one gallon. This solution was then dispersed in an aqueous phase to provide a final concentration of .02% of the siloxane. Bottles sprayed with this solution in the manner described in Example I were found to exhibit similar improved characteristics.

Example III

A solution was prepared by dissolving tetracaprylate tetrasiloxane amine hydrochloride (2.2 pounds), polyoxypropylene laurate (average M. W. 1800) (.15 pound), propionic acid (.7 pound) in sufficient acetone to form a total volume of one gallon. This concentrate was then diluted with tap water to form an aqueous concentration of .05% of the siloxane. The bottles were coated with this solution by dipping therein at room temperature and allowing the excess to drain off as in Example I. The improved surface properties of gloss and lubricity were again observed.

Example IV

A solution was prepared by dissolving tetrapelargonate tetrasiloxane amine hydrobromide (1.6 pounds), polyoxyethylene palmitate (average M. W. 3070) (.16 pound), glacial acetic acid (1 pound) in sufficient tert.-amyl alcohol to make one gallon total volume. An aqueous solution was formed by dispersing this solution in ordinary tap water to provide a final concentration of .06% by weight of the siloxane. Bottles sprayed with this aqueous solution exhibited the improved properties noted in the previous examples.

Example V

A solution was prepared by dissolving trilinoleate trisiloxane amine hydrobromide (3 pounds), polyoxypropylene linoleate (average M. W. 2230) (.2 pound), propionic acid (.7 pound) in sufficient tert.-butyl alcohol to make one gallon of solution. This solution was then dispersed in tap water to form an aqueous mixture having a concentration by weight of .4% of the siloxane. Bottles were treated with this solution as described in Example I and again, the beneficial properties of increased strength and lubricity were observed. It was also observed, however, that the more concentrated solution employed in this example did not yield proportionately increased improvement in these characteristics.

Example VI

A solution was prepared by dissolving tetrastearate tetrasiloxane amine hydrobromide (2 pounds), polyoxypropylene stearate (average M. W. 1200) (.06 pound) in sufficient tert.-butyl alcohol to yield one gallon of the concentrate. Bottles which were coated with this solution either by dipping or spraying as described in Examples I and II above were found to have a glossy slick surface similar to that obtained in the previous examples. It was noted, however, that the aqueous solution slowly deteriorated with time apparently due to the slow hydrolysis of the siloxane.

Example VII

A solution was prepared by dissolving tristearate trisiloxane amine hydrochloride (1.86 pounds), polyoxyethylene stearate (average M. W. 2045) (.1 pound), glacial acetic acid (.55 pound) in sufficient n-propyl alcohol to form one gallon of the concentrate. Bottles were treated with this solution exactly as described in Example I. While the properties of increased lubricity and strength were noted, in this instance a slightly increased breakage rate was observed in the normal filling line operations with the bottles so coated. This was apparently due to the proportionate decrease in strength as a result of the use of n-propyl alcohol in place of tert.-butyl alcohol.

Example VIII

A solution was prepared by dissolving tristearate trisiloxane amine hydrochloride (1.86 pounds), polyoxyethylene stearate (average M. W. 2045) (.1 pound), glacial acetic acid (.55 pound) in methoxy methanol to a total volume of one gallon. This solution was then dispersed in an aqueous phase to provide a final concentration by weight of .05% of the siloxane. Bottles were coated with this solution by spraying at room temperature and the improved surface properties of gloss and lubricity were observed.

Example IX

A solution was prepared by dissolving tristearate trisiloxane amine hydrochloride (1.86 pounds), polyoxyethylene stearate (average M. W. 2045) (.1 pound), glacial acetic acid (.55 pound) in ethylene glycol to form a total volume of one gallon of solution. The solution was dispersed in an aqueous phase to provide a final concentration of .1% of siloxane, which solution exhibited the same coating characteristics as observed in the previous examples.

*Example X*

A solution was prepared by dissolving tristearate trisiloxane amine hydrochloride (1.86 pounds), polyoxyethylene stearate (average M. W. 2045) (.1 pound), glacial acetic acid (.55 pound) in diethylene glycol to form one gallon of the concentrate. The concentrate was dispersed in ordinary tap water to provide a final aqueous concentration of about .03% of the siloxane. Bottles sprayed with this aqueous mixture were found to have deposited thereon a coating similar to that described in the previous examples.

*Example XI*

A solution was prepared by dissolving tristearate trisiloxane amine hydrochloride (1.86 pounds), polyoxyethylene stearate (average M. W. 2045) (.1 pound), glacial acetic acid (.55 pound) in ethylacetate to a total volume of one gallon. After dispersion in an aqueous phase to provide a final concentration of .02% by weight of the siloxane, it was found that bottles could be coated therewith and provided with the advantageous properties noted above.

*Example XII*

A solution was prepared by dissolving tristearate trisiloxane amine hydrochloride (1.82 pounds) polyoxyethylene stearate (average M. W. 2045) (.11 pound) glacial acetic acid (.58 pound) germicide (.2 pound) in sufficient tert-.butyl alcohol to make one gallon of solution. The germicide used was a polyethoxy polypropoxy ethanol-iodine complex (i. e. a Pluronic-iodine complex) containing 15% iodine. An aqueous solution prepared with tap water and containing .185% of this concentrate (5 ppm of iodine) was prepared. Bottles coated with this mixture exhibited a decrease of only 1.8% lubricity as compared to the coating composition as described in Example I.

The germicidal compounds described in U. S. Patent 2,759,869 comprise polyether alcohol-iodine complexes which are soluble in water. We have prepared coating solutions similar to the above, but containing a smaller amount of this germicide. It was observed that while the resultant lubricity from these coatings was slightly decreased, as far as practical application is concerned, the decrease is not significant. A specific example of this embodiment of the invention is described in Example XII above.

This is a continuation-in-part of applicants' application Serial No. 623,503, filed November 20, 1956, now abandoned.

Other modifications and embodiments of this invention will be obvious to one skilled in the art, and accordingly, the scope of the invention is limited only by the following claims.

We claim:

1. A coating composition comprising a siloxane having the formula:

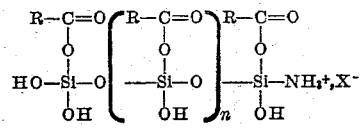

wherein R is an aliphatic radical, X is a halogen, and $n$ is an integer from 1 to 3, and a polyoxy alkylene fatty acid ester of the formula:

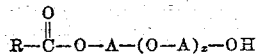

wherein A is a lower alkylene radical, R is as defined above, and $x$ is a number from 8 to 100, and wherein said polyoxy alkylene fatty acid ester is present in an amount from about 0.2% to about 50% by weight of the mixture of said ester and said siloxane.

2. The composition of claim 1 wherein $n$ is 1.

3. The composition of claim 1 wherein said amount is from about 2% to about 8% by said weight.

4. The composition of claim 1 having incorporated therein a lower alkanoic acid.

5. The composition of claim 4 wherein said siloxane is present in an amount from 15–20 parts, said ester is present in an amount from 0.03 parts to 10 parts, and said acid is present in an amount from 0.5 parts to 10 parts, said components being dissolved in an organic solvent miscible with water and selected from the group consisting of lower alkyl esters, alcohols, glycols, ketones, monohydric ether alcohols and ether glycols.

6. A method for coating glass objects which comprises applying the composition of claim 1 to the surface of said glass object, allowing the composition to drain free and dry thereon, both operations being conducted at substantially ambient temperatures.

7. The method of claim 6 wherein said composition is applied by spraying said glass object therewith.

8. The method of claim 6 wherein said composition is applied by dipping said glass object therein.

9. A coating composition comprising the compound:

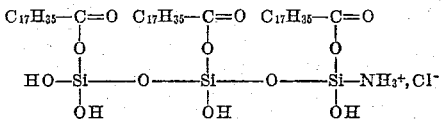

and a second compound:

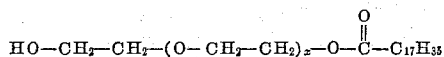

wherein the average value of $x$ is 40, and a lower alkanoic acid, and wherein said second compound is present in an amount from about 0.2% to about 50% by weight of the mixture of the two compounds.

10. A method for coating glass objects which comprises applying the composition of claim 9 to the surface of said glass object, allowing the composition to drain free and dry thereon, both operations being conducted at substantially ambient temperatures.

11. The composition of claim 9 wherein said amount is from about 2% to about 8% of said weight.

12. The composition of claim 9 wherein said mixture is in the form of an aqueous suspension.

13. The composition of claim 12 wherein ordinary tap water is employed to form said aqueous suspension.

14. The composition of claim 9 wherein said alkanoic acid is acetic acid.

15. The composition of claim 14 further defined by said composition being dissolved in an aliphatic alcohol.

16. The composition of claim 15 wherein said aliphatic alcohol is tert.-butyl alcohol.

No references cited.